(12) United States Patent
Muppala (10) Patent No.: US 7,742,406 B1
(45) Date of Patent: Jun. 22, 2010

(54) COORDINATED ENVIRONMENT FOR CLASSIFICATION AND CONTROL OF NETWORK TRAFFIC

(75) Inventor: Suresh Muppala, Cupertino, CA (US)

(73) Assignee: Packeteer, Inc., Cupertino, CA (US)

( * ) Notice: Subject to any disclaimer, the term of this patent is extended or adjusted under 35 U.S.C. 154(b) by 1039 days.

(21) Appl. No.: 11/019,502

(22) Filed: Dec. 20, 2004

(51) Int. Cl.
  *H04L 12/26* (2006.01)
  *H04L 12/28* (2006.01)
  *H04L 12/56* (2006.01)
(52) U.S. Cl. ....................... 370/230; 370/392
(58) Field of Classification Search ................. None
  See application file for complete search history.

(56) References Cited

U.S. PATENT DOCUMENTS

| | | | | |
|---|---|---|---|---|
| 6,490,630 | B1 * | 12/2002 | Poon et al. | 370/229 |
| 6,778,530 | B1 * | 8/2004 | Greene | 370/389 |
| 6,937,560 | B2 * | 8/2005 | Enns et al. | 370/229 |
| 6,963,578 | B2 * | 11/2005 | Akahane et al. | 370/417 |
| 7,395,538 | B1 * | 7/2008 | Carney et al. | 718/105 |
| 7,480,246 | B2 * | 1/2009 | Agarwal et al. | 370/412 |
| 7,512,129 | B1 * | 3/2009 | Favor et al. | 370/394 |
| 7,567,504 | B2 * | 7/2009 | Darling et al. | 370/216 |
| 7,649,879 | B2 * | 1/2010 | Parker | 370/389 |
| 2002/0080786 | A1 * | 6/2002 | Roberts | 370/389 |
| 2003/0112808 | A1 * | 6/2003 | Solomon | 370/400 |
| 2005/0220011 | A1 * | 10/2005 | Parker et al. | 370/229 |
| 2008/0037546 | A1 * | 2/2008 | Ishikawa et al. | 370/392 |
| 2009/0089239 | A1 * | 4/2009 | Herrera et al. | 706/59 |

* cited by examiner

*Primary Examiner*—Ayaz R Sheikh
*Assistant Examiner*—Timothy J Weidner
(74) *Attorney, Agent, or Firm*—Baker Botts L.L.P.

(57) ABSTRACT

Methods, apparatuses and systems directed to the coordinated classification of network traffic. In one implementation, the present invention enables a coordinated network environment for traffic classification where an upstream network device classifies a data flow and adds traffic class information to at least one packet in the data flow. Downstream network devices in the communications path to the destination host can use the traffic class information in the modified packet, bypassing at least some of the local traffic classification operations and thereby reducing CPU utilization. In one implementation, the last downstream network device strips the traffic classification information from the modified packet before it is forwarded to the destination host. Embodiments of the invention reduce or eliminate redundant network traffic classification operations performed by a plurality of network devices in a communications path.

21 Claims, 5 Drawing Sheets

COORDINATED ENVIRONMENT FOR CLASSIFICATION AND CONTROL OF NETWORK TRAFFIC

CROSS-REFERENCE TO RELATED APPLICATIONS AND PATENTS

This application makes reference to the following commonly owned U.S. patent applications and patents, which are incorporated herein by reference in their entirety for all purposes:

U.S. patent application Ser. No. 08/762,828 now U.S. Pat. No. 5,802,106 in the name of Robert L. Packer, entitled "Method for Rapid Data Rate Detection in a Packet Communication Environment Without Data Rate Supervision;"

U.S. patent application Ser. No. 08/970,693 now U.S. Pat. No. 6,018,516, in the name of Robert L. Packer, entitled "Method for Minimizing Unneeded Retransmission of Packets in a Packet Communication Environment Supporting a Plurality of Data Link Rates;"

U.S. patent application Ser. No. 08/742,994 now U.S. Pat. No. 6,038,216, in the name of Robert L. Packer, entitled "Method for Explicit Data Rate Control in a Packet Communication Environment without Data Rate Supervision;"

U.S. patent application Ser. No. 09/977,642 now U.S. Pat. No. 6,046,980, in the name of Robert L. Packer, entitled "System for Managing Flow Bandwidth Utilization at Network, Transport and Application Layers in Store and Forward Network;"

U.S. patent application Ser. No. 09/106,924 now U.S. Pat. No. 6,115,357, in the name of Robert L. Packer and Brett D. Galloway, entitled "Method for Pacing Data Flow in a Packet-based Network;"

U.S. patent application Ser. No. 09/046,776 now U.S. Pat. No. 6,205,120, in the name of Robert L. Packer and Guy Riddle, entitled "Method for Transparently Determining and Setting an Optimal Minimum Required TCP Window Size;"

U.S. patent application Ser. No. 09/479,356 now U.S. Pat. No. 6,285,658, in the name of Robert L. Packer, entitled "System for Managing Flow Bandwidth Utilization at Network, Transport and Application Layers in Store and Forward Network;"

U.S. patent application Ser. No. 09/198,090 now U.S. Pat. No. 6,412,000, in the name of Guy Riddle and Robert L. Packer, entitled "Method for Automatically Classifying Traffic in a Packet Communications Network;"

U.S. patent application Ser. No. 09/198,051, in the name of Guy Riddle, entitled "Method for Automatically Determining a Traffic Policy in a Packet Communications Network;"

U.S. patent application Ser. No. 09/206,772, now U.S. Pat. No. 6,456,360, in the name of Robert L. Packer, Brett D. Galloway and Ted Thi, entitled "Method for Data Rate Control for Heterogeneous or Peer Internetworking;"

U.S. patent application Ser. No. 09/710,442, in the name of Todd Krautkremer and Guy Riddle, entitled "Application Service Level Mediation and Method of Using the Same;"

U.S. patent application Ser. No. 10/015,826 in the name of Guy Riddle, entitled "Dynamic Tunnel Probing in a Communications Network;"

U.S. patent application Ser. No. 10/039,992, in the name of Michael J. Quinn and Mary L. Laier, entitled "Method and Apparatus for Fast Lookup of Related Classification Entities in a Tree-Ordered Classification Hierarchy;"

U.S. patent application Ser. No. 10/108,085, in the name of Wei-Lung Lai, Jon Eric Okholm, and Michael J. Quinn, entitled "Output Scheduling Data Structure Facilitating Hierarchical Network Resource Allocation Scheme;"

U.S. patent application Ser. No. 10/155,936 now U.S. Pat. No. 6,591,299, in the name of Guy Riddle, Robert L. Packer, and Mark Hill, entitled "Method For Automatically Classifying Traffic With Enhanced Hierarchy In A Packet Communications Network;"

U.S. patent application Ser. No. 10/236,149, in the name of Brett Galloway and George Powers, entitled "Classification Data Structure enabling Multi-Dimensional Network Traffic Classification and Control Schemes;"

U.S. patent application Ser. No. 10/453,345, in the name of Scott Hankins, Michael R. Morford, and Michael J. Quinn, entitled "Flow-Based Packet Capture;"

U.S. patent application Ser. No. 10/611,573, in the name of Roopesh Varier, David Jacobson, and Guy Riddle, entitled "Network Traffic Synchronization Mechanism;"

U.S. patent application Ser. No. 10/676,383 in the name of Guy Riddle, entitled "Enhanced Flow Data Records Including Traffic Type Data;"

U.S. patent application Ser. No. 10/720,329, in the name of Weng-Chin Yung, Mark Hill and Anne Cesa Klein, entitled "Heuristic Behavior Pattern Matching of Data Flows in Enhanced Network Traffic Classification;"

U.S. patent application Ser. No. 10/810,785 in the name of Azeem Feroz, Wei-Lung Lai, and Jim Stabile, entitled "Slow-Start Adaptive Mechanisms to Improve Efficiency of Bandwidth Allocation;"

U.S. patent application Ser. No. 10/812,198 in the name of Michael Robert Morford and Robert E. Purvy, entitled "Adaptive, Application-Aware Selection of Differentiated Network Services;"

U.S. patent application Ser. No. 10/843,185 in the name of Guy Riddle, Curtis Vance Bradford and Maddie Cheng, entitled "Packet Load Shedding;"

U.S. patent application Ser. No. 10/858,340 in the name of Roopesh Varier, James J. Stabile, Paul Leslie Archard, Guy Riddle, and David Jacobson, entitled "Network Traffic Synchronization and Data Compression in Redundant Network Topologies;" and U.S. patent application Ser. No. 10/938,435 in the name of Guy Riddle, entitled "Classification and Management of Network Traffic Based on Attributes Orthogonal to Explicit Packet Attributes."

FIELD OF THE INVENTION

The present invention relates to computer networks and, more particularly, to methods, apparatuses and systems directed to the classification and control of network traffic.

BACKGROUND OF THE INVENTION

Enterprises have become increasingly dependent on computer network infrastructures to provide services and accomplish mission-critical tasks. Indeed, the performance, security, and efficiency of these network infrastructures have become critical as enterprises increase their reliance on distributed computing environments and wide area computer networks.

To facilitate monitoring, management and control of network environments, a variety of network devices, applications, technologies and services have been developed. For example, certain data flow rate control mechanisms have been developed to provide a means to control and optimize efficiency of data transfer as well as allocate available bandwidth among a variety of business enterprise functionalities. For example, U.S. Pat. No. 6,038,216 discloses a method for explicit data rate control in a packet-based network environment without data rate supervision. Data rate control directly moderates the rate of data transmission from a sending host, resulting in just-in-time data transmission to control inbound traffic and reduce the inefficiencies associated with dropped packets. Bandwidth management devices allow for explicit data rate control for flows associated with a particular traffic classification. For example, U.S. Pat. No. 6,412,000, above, discloses automatic classification of network traffic for use in connection with bandwidth allocation mechanisms. U.S. Pat. No. 6,046,980 discloses systems and methods allowing for application layer control of bandwidth utilization in packet-based computer networks. For example, bandwidth management devices allow network administrators to specify policies operative to control and/or prioritize the bandwidth allocated to individual data flows according to traffic classifications. In addition, certain bandwidth management devices, as well as certain routers, allow network administrators to specify aggregate bandwidth utilization controls to divide available bandwidth into partitions. With some network devices, these partitions can be configured to provide a minimum bandwidth guarantee, and/or cap bandwidth, as to a particular class of traffic. An administrator specifies a traffic class (such as FTP data, or data flows involving a specific user or network application) and the size of the reserved virtual link—i.e., minimum guaranteed bandwidth and/or maximum bandwidth. Such partitions can be applied on a per-application basis (protecting and/or capping bandwidth for all traffic associated with an application) or a per-user basis (controlling, prioritizing, protecting and/or capping bandwidth for a particular user). In addition, certain bandwidth management devices allow administrators to define a partition hierarchy by configuring one or more partitions dividing the access link and further dividing the parent partitions into one or more child partitions.

Furthermore, network security is another concern, such as the detection of computer viruses, as well as prevention of Denial-of-Service (DoS) attacks on, or unauthorized access to, enterprise networks. Accordingly, firewalls and other network devices are deployed at the edge of such networks to filter packets and perform various operations in response to a security threat. In addition, packet capture and other network data gathering devices are often deployed at the edge of, as well as at other strategic points in, a network to allow network administrators to monitor network conditions. Other network devices also perform security or data gathering or monitoring functions, such as packet capture devices.

Many of the systems and technologies discussed above incorporate or utilize traffic classification mechanisms to perform their respective functions. Identification of traffic types associated with data flows traversing a network generally involves the application of matching criteria or rules to explicitly presented or readily discoverable attributes of individual packets, or groups of packets, against an application signature which may comprise a protocol identifier (e.g., TCP, HTTP, UDP, MIME types, etc.), a port number, and even an application-specific string of text in the payload of a packet. Indeed, the rich Layer 7 classification functionality of Packetshaper® bandwidth management devices offered by Packeteer®, Inc. of Cupertino, Calif. is an attractive feature for network administrators, as it allows for accurate identification of a variety of application types.

The through-put of network devices that utilize traffic classification can become a concern, as traffic classification, especially granular classification mechanisms, can include a variety of CPU-intensive operations. If a network device, such as an application traffic management device, becomes a bottleneck, it can defeat the very purpose for which the network device was deployed—namely, increased efficiency and performance. Network device vendors, therefore, must configure their network devices with sufficient computational resources to avoid creating a performance bottleneck. Classification of data flows especially in modern network environments, however, is often one of the most CPU-intensive tasks performed by the network devices. In addition, recent trends seen in many network applications suggest that the resource intensive nature of network traffic classification will only increase. Indeed, an increasing number of network applications employ data compression, encryption technology, and/or proprietary protocols that obscure or prevent identification of various application-specific attributes, often leaving well-known port numbers as the only basis for classification. In fact, as networked applications become increasingly complex, data encryption and/or compression has become a touted security or optimization feature. Indeed, data encryption addresses the concern of security and privacy issues, but also makes it much more difficult for intermediate network devices to identify the applications that employ them. In addition, traffic classification based solely on well-known port numbers can be problematic, especially where a network application uses dynamic port number assignments or incorrectly uses a well-known port number, leading to misclassification of the data flows. In addition, classifying such encrypted network traffic as unknown (or encrypted) and applying a particular rate or admission policy to unknown traffic classes undermines the granular control otherwise provided by bandwidth management devices and, further, may cause legitimate, encrypted traffic to suffer as a result.

Traffic classification mechanisms have to adapt to address these circumstances. For example, U.S. application Ser. No. 10/938,435 discloses network traffic classification mechanisms that classify network traffic based on the behavioral attributes of the data flows. U.S. application Ser. No. 10/720,329 discloses the classification of data flows based on heuristic behavior pattern matching. These classification mechanisms differ from traditional classification mechanisms which classify traffic based on explicitly presented attributes of individual data packets; however, they are quite resource intensive, requiring maintenance and analysis of a significant amount of stateful information for each data flow.

Enterprises network topologies can span a vast array of designs and connection schemes depending on the enterprise's resource requirements, the number of locations or offices to connect, desired service levels, costs and the like. A given enterprise often must support multiple LAN or WAN segments that support headquarters, branch offices and other operational and office facilities. Indeed, enterprise network design topologies often include multiple, interconnected LAN and WAN segments in the enterprise's intranet, and multiple paths to extranets and the Internet. These network topologies often require the deployment of a variety of network devices at each remote facility. In addition, some network systems are end-to-end solutions, such as application traffic optimizers using protocol intervention technologies, requiring network devices at each end of a communications path between, for example, a main office and a remote facility.

In a typical network environment where the classification information is not exchanged, each network device separately analyzes the data flows in order to classify them. Often times, the methods used for classifying network traffic on these network devices will result in the same or similar classification of the data flows traversing the network devices. While the prior art is suitable for its intended objective, the separate classification of data flows traversing a plurality of identical or similar network devices results in certain inefficiencies. In other words, a downstream network device, such as bandwidth management device, located along a communications path traversed by a given data flow fails to take advantage of the classification information derived by an upstream network device in the communications path. Additionally, in fault tolerant networks, redundant networking devices are used in active-and-standby configurations. U.S. application Ser. Nos. 10/611,573 and 10/858,340 disclose the configuration and deployment of application traffic management devices in redundant network topologies. In these deployments, the active and standby network devices transmit synchronization packets to maintain the same state, while one or both network devices forward network traffic. In these configurations, both network devices classify the same traffic independently in order to maintain the same flow state and statistics information. The resources spent classifying the traffic reduces performance, which can become a concern as traffic loads increase.

In light of the foregoing, a need in the art exists for increasing the efficiency and performance of network traffic classification. A need also exists in the art for reducing the resource requirements associated with network traffic classification. Embodiments of the present invention substantially fulfill these needs.

SUMMARY OF THE INVENTION

The present invention provides methods, apparatuses and systems directed to the coordinated classification of network traffic. In one implementation, the present invention enables a coordinated network environment for traffic classification where an upstream network device classifies a data flow and adds traffic class information to at least one packet in the data flow. Downstream network devices in the communications path to the destination host can use the traffic class information in the modified packet, bypassing at least some of the local traffic classification operations and thereby reducing CPU utilization. In one implementation, the last downstream network device strips the traffic classification information from the modified packet before it is forwarded to the destination host.

In one implementation, the traffic classification information is added using a tag or header added to the first packet in a given flow and, potentially, one or more subsequent packets in the flow when additional traffic classification information is obtained. Intermediate network devices along the communication path can also use the traffic classification information and forward the packets with the traffic classification tag without modification. Embodiments of the present invention reduce or eliminate redundant traffic classification operations, thereby improving overall system performance. As discussed in more detail below, the present invention can be applied in a variety of contexts and system architectures. For example, the present invention can be applied to a network environment including a plurality of application traffic management devices. Other network devices can also be used, such as packet capture devices, firewalls, gateways, proxies and the like. Furthermore, the present invention can be applied in a network system where upstream and downstream network devices are disposed in a communication path between networks or end systems. The present invention can also be applied between partner network devices in redundant network topologies.

DESCRIPTION OF PREFERRED EMBODIMENT(S)

Figure 1:
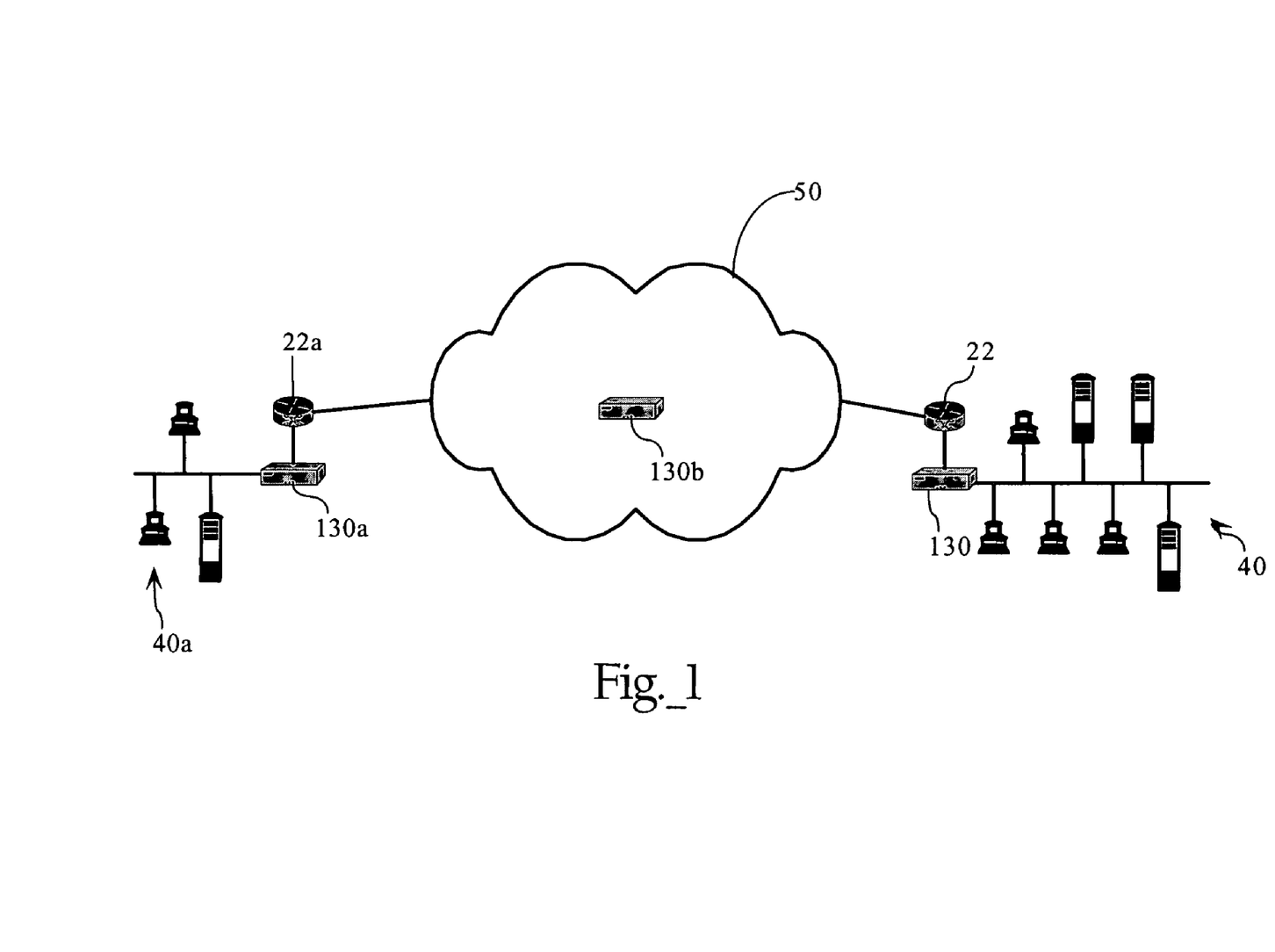
FIG. 1 is a functional block diagram illustrating a computer network system architecture in which an embodiment of the present invention may operate.
Figure 2:
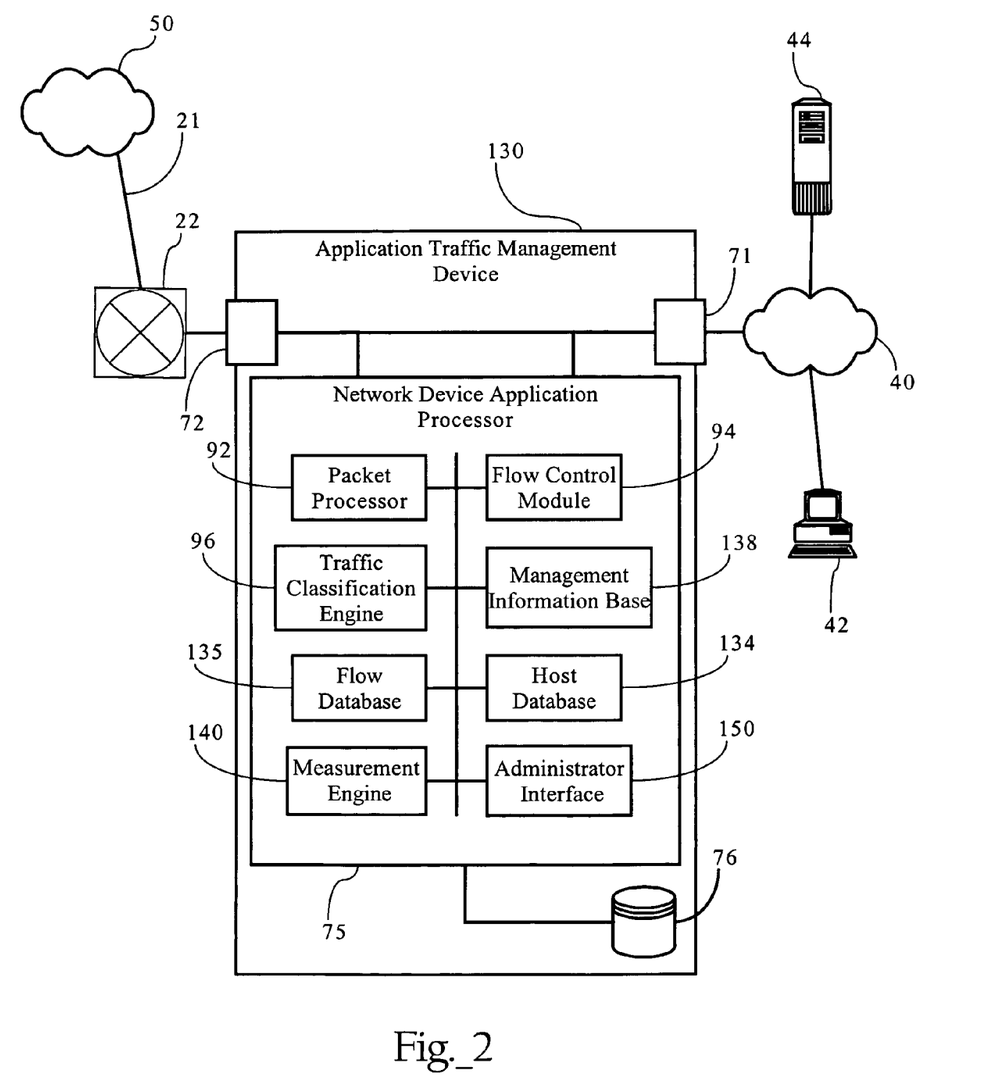
FIG. 2 is a functional block diagram illustrating the functionality of a network device, according to one implementation of the present invention, for use in a coordinated traffic classification environment.

FIGS. 1 and 2 illustrate an exemplary network environment in which an embodiment of the present invention operates. Of course, the present invention can be applied to a variety of network architectures. FIG. 1 illustrates, for didactic purposes, a network 50, such as wide area network, interconnecting a first enterprise network 40, supporting a central operating or headquarters facility, and a second enterprise network 40a, supporting a branch office facility. As FIG. 2 shows, the first network 40 interconnects several TCP/IP end systems, including client devices 42 and server device 44, and provides access to resources operably connected to computer network 50 via router 22 and access link 21. Access link 21 is a physical and/or logical connection between two networks, such as computer network 50 and network 40. The computer network environment, including network 40 and network 50 is a packet-based communications environment, employing TCP/IP protocols, and/or other suitable protocols, and has a plurality of interconnected digital packet transmission stations or routing nodes. First network 40, and network 40a, can each be a local area network, a wide area network, or any other suitable network.

As FIGS. 1 and 2 illustrate, application traffic management device 130, in one implementation, is deployed at the edge of network 40. In one implementation, application traffic management device 130 is operative to classify and manage data flows traversing access link 21. However, the coordinated traffic classification functionality according to the present invention can be integrated into a variety of network devices, such as proxies, firewalls, packet capture or network monitoring equipment, VPN servers, web services network gateways or brokers, and the like. Furthermore, as shown in FIG. 1, application traffic management device 130, in one implementation, operates in connection with either or both of application traffic management device 130a, deployed at the edge of network 40a, and application traffic management device 130b deployed within network 50. In other implementations however, the coordinated traffic classification functionality according to the present invention can be used in connection with different network device types, each of which utilize network traffic classification to perform a network function. For example, the present invention can be applied to a network system including an application traffic management device disposed at a first point in a communications path, and a traffic monitoring device disposed at a second point in the communications path.

As FIG. 2 illustrates, network application traffic management device 130, in one implementation; comprises network device application processor 75, and first and second network interfaces 71, 72, which operably connect application traffic management device 130 to the communications path between router 22 and network 40. Network device application processor 75 generally refers to the functionality implemented by application traffic management device 130, such as network monitoring or reporting, application traffic management, and the like. In one embodiment, network device application processor 75 is a combination of hardware and software, such as a central processing unit, memory, a system bus, an operating system, device drivers, and one or more software modules implementing the functions performed by application traffic management device 130, as well as the coordinated traffic classification functionality described herein. For didactic purposes, application traffic management device 130 is configured to manage network traffic traversing access link 21. The above-identified patents and patent applications, incorporated by reference herein, disclose various functionalities and features that may be incorporated into application traffic management devices according to various implementations of the present invention. In one implementation, the configuration of application traffic management devices 130a, 130b is the same or substantially similar to application traffic management device 130, as described herein.

In one embodiment, first and second network interfaces 71, 72 are the hardware communications interfaces that receive and transmit packets over the computer network environment. In one implementation, first and second network interfaces 71, 72 reside on separate network interface cards operably connected to the system bus of application traffic management device 130. In another implementation, first and second network interfaces reside on the same network interface card. In addition, the first and second network interfaces 71, 72 can be wired network interfaces, such as Ethernet (IEEE 802.3) interfaces, and/or wireless network interfaces, such as IEEE 802.11, BlueTooth, satellite-based interfaces, and the like. As FIG. 2 illustrates, application traffic management device 130, in one embodiment, includes persistent memory 76, such as a hard disk drive or other suitable memory device, such writable CD, DVD, or tape drives. In other implementations, application traffic management device 130 can include additional network interfaces, beyond network interfaces 71 and 72, to support additional access links or other functionality. Furthermore, U.S. application Ser. No. 10/843,185 provides a description of the operation of various modules, such as network interface drivers, and data structures for receiving into memory and processing packets encountered at network interfaces 71, 72.

As FIG. 2 illustrates, network device application processor 75, in one implementation, includes a packet processor 92, flow control module 94, and traffic classification engine 96. Network device application processor 75, in one implementation, further comprises host database 134, flow database 135, measurement engine 140, management information base 138, and administrator interface 150. In one embodiment, the packet processor 92 is operative to process data packets, such as detecting new data flows, parsing the data packets for various attributes (such as source and destination addresses, and the like) and storing packet attributes in a buffer structure, and maintaining one or more flow variables or statistics (such as packet count) in connection with the data flows and/or the source/destination hosts. The traffic classification engine 96, as discussed more fully below, is operative to classify data flows based on one or more attributes associated with the data flows. Traffic classification engine 96, in one implementation, stores traffic classes associated with data flows encountered during operation of application traffic management device 130, as well as manually created traffic classes configured by a network administrator, in a hierarchical traffic class structure. In one embodiment, traffic classification engine 96 stores traffic classes, in association with pointers to traffic management policies or pointers to data structures defining such traffic management policies. In one implementation, flow control module 94 is operative to apply bandwidth utilization controls to data flows traversing the access link 21 in the inbound and/or outbound directions.

As discussed above, in one implementation, network device application processor 75 further comprises measurement engine 140, management information base (MIB) 138, and administrator interface 150. Management information base 138 is a database of standard and extended network objects related to the operation of application traffic management device 130. Measurement engine 140 maintains measurement and statistical data relating to operation of application traffic management device 130 to allow for monitoring of bandwidth utilization and network performance across access link 21 with respect to a plurality of bandwidth utilization and other network statistics on an aggregate and/or per-traffic-class level.

Administrator interface 150 facilitates the configuration of application traffic management device 130 to adjust or change operational and configuration parameters associated with the device. For example, administrator interface 150 allows administrators to select identified traffic classes and associate them with traffic management policies. Administrator interface 150 also displays various views associated with a hierarchical traffic classification scheme and allows administrators to configure or revise the hierarchical traffic classification scheme. Administrator interface 150 can provide a command line interface and/or a graphical user interface accessible, for example, through a conventional browser on client device 42.

A.1. Packet Processing

As discussed above, packet processor 92, in one implementation, is operative to detect new data flows, instantiate data structures associated with the flows and parse packets to populate one or more fields in the data structures. In one embodiment, when packet processor 92 encounters a new data flow it stores the source and destination IP addresses contained in the packet headers in host database 134. Packet processor 92 further constructs a control block (flow) object in flow database 135 including attributes characterizing a specific flow between two end systems, such as source and destination port numbers, etc. Other flow attributes in the flow object may include application specific attributes gleaned from layers above the TCP layer, such as codec identifiers for Voice over IP calls, Citrix database identifiers, and the like. Packet processor 92 also stores meta information relating to the received packets in a packet buffer—a memory space, typically in dynamic random access memory (DRAM), reserved for packets traversing application traffic management device 130. In one embodiment, the packets are stored in the packet buffer with a wrapper including various information fields, such as the time the packet was received, the packet flow direction (inbound or outbound), and a pointer to the flow object corresponding to the flow of which the packet is a part.

In typical network deployments, the majority of data flows are generally TCP or UDP flows. However, any suitable transport layer flow can be recognized and detected. As discussed more fully below, in one embodiment, flows are identified based on the following flow attributes: 1) source IP address, 2) destination IP address, 3) source port number, 4) destination port number, and 5) protocol (derived from the "protocol" field in IPv4 headers, and the "NextHeader" field in IPv6 headers). One skilled in the art will recognize that flows can be identified in relation to a variety of attributes and combinations of attributes. In addition, methods for determining new data flows and assigning packets to existing data flows are well known in the art and also depend on the particular transport layer protocol employed. For a TCP flow, for example, packet processor 92 can determine a new data flow by detecting SYN, SYN/ACK, and/or ACK packets. However, a new data flow, depending on the network protocol associated with the flow, can simply be a data flow for which there is no corresponding flow object. For example, with UDP and GRE flows (where there is no explicit connection or handshake mechanism, such as SYN packets), a new flow is recognized by associating the source and destination addresses and port numbers to the flow and the flow type (e.g., UDP, GRE, etc.). Accordingly, when a UDP packet identifies a new address/port pair, the attributes discussed above are stored in a data structure along with the time of last packet. A new UDP flow between the same address/port pairs can be determined by comparing the last packet time to a threshold value (e.g., 2 minutes). If the difference between the time of the last packet and the time of the current packet is greater than the threshold, the current packet is deemed part of a new flow. In another implementation, a background and/or separate process can periodically compare the last packet times associated with a flow to a threshold period of time and deem the flow terminated if the last packet time is beyond the threshold period of time. The termination of TCP connections is typically detected by identifying FIN packets; however, the timeout mechanisms discussed above can be used in situations where a FIN packet is not detected.

In one embodiment, a control block (flow) object contains a flow specification object including such attributes as pointers to the "inside" and "outside" IP addresses in host database 134, as well as other flow specification parameters, such as inside and outside port numbers, service type (see below), protocol type and other parameters characterizing the data flow. In one embodiment, such parameters can include information gleaned from examination of data within layers 2 through 7 of the OSI reference model. U.S. Pat. No. 6,046,980 and U.S. Pat. No. 6,591,299, as well as others incorporated by reference herein, disclose classification of data flows for use in a packet-based communications environment. FIG. 2 illustrates the concept associated with inside and outside addresses, where network interface 71 is the "inside" network interface and network interface 72 is the "outside" network interface. As discussed above, in one embodiment, a flow specification object includes an "inside" and "outside" address relative to application traffic management device 130. See FIG. 1. For a TCP/IP packet, packet processor 92 can compute the inside and outside addresses based on the source and destination network addresses of the packet and the direction of the packet flow.

In one embodiment, packet processor 92 creates and stores control block objects corresponding to data flows in flow database 135. In one embodiment, control block object attributes include a pointer to a corresponding flow specification object, as well as other flow state parameters, such as TCP connection status, timing of last packets in the inbound and outbound directions, speed information, apparent round trip time, packet count, etc. To support the coordinated traffic classification functionality described herein, control block objects include a remote classification flag which, as discussed below, determines whether classification of the data flow is to be performed locally, or by a remote network device. In the latter instance, traffic classification information is obtained by inspecting a tag or other identifier appended to at least one of the packets in the data flow. Control block object attributes further include at least one traffic class identifier (or pointer(s) thereto) associated with the data flow, as well as policy parameters (or pointers thereto) corresponding to the identified traffic class. In one embodiment, control block objects further include a list of traffic classes for which measurement data (maintained by measurement engine 140) associated with the data flow should be logged. In one embodiment, to facilitate association of an existing control block object to subsequent packets associated with a data flow or connection, flow database 135 further maintains a control block hash table including a key comprising a hashed value computed from a string comprising the inside IP address, outside IP address, inside port number, outside port number, and protocol type (e.g., TCP, UDP, etc.) associated with a pointer to the corresponding control block object. According to this embodiment, to identify whether a control block object exists for a given data flow, packet processor 92 hashes the values identified above and scans the hash table for a matching entry. If one exists, packet processor 92 associates the pointer to the corresponding control block object with the packets in the data flow.

To allow for identification of service types (e.g., FTP, HTTP, etc.), packet processor 92, in one embodiment, is supported by one to a plurality of service identification tables in a relational database that allow for identification of a particular service type (e.g., application, protocol, etc.) based on the attributes of a particular data flow. Of course, other suitable data structures can be used to support the identification of service types, such as a set of hard-coded instructions, an XML file, and the like. In one embodiment, a services table including the following fields: 1) service ID, 2) service aggregate (if any), 3) name of service, 4) service attributes (e.g., port number, outside IP address, etc.), and 5) default bandwidth management policy. A service aggregate encompasses a combination of individual services (each including different matching criteria, such as different port numbers, etc.) corresponding to the service aggregate. When application traffic management device 130 encounters a new flow, packet processor 92 analyzes the data flow against the service attributes in the services table to identify a service ID corresponding to the flow. In one embodiment, packet processor 92 may identify more than one service ID associated with the flow. In this instance, packet processor 92 associates the more/most specific service ID to the flow. For example, network traffic associated with a peer-to-peer file sharing service may be identified as TCP or HTTP traffic, as well as higher level traffic types such as the actual file sharing application itself (e.g., Napster, Morpheus, etc.). In this instance, packet processor 92 associates the flow with the most specific service ID. A traffic class maintained by traffic classification engine 96 may be configured to include matching rules based on the service IDs in the services table. For example, a matching rule directed to HTTP traffic may simply refer to the corresponding service ID, as opposed to the individual attributes that packet processor 92 uses to initially identify the service. As discussed more fully below, packet processor 92 may bypass or omit the local identification of service types for a flow depending on the state of the remote classification flag in the corresponding flow object.

Packet processor 92, in one implementation, maintains certain data in host database 134 that support the classification of data flows based on behavioral attributes of the end systems associated with the flows. U.S. application Ser. No. 10/938,435 describes some of the data flow metrics that can be maintained in host database 134, according to an embodiment of the present invention. For example, packet processor 92, in one embodiment, maintains, inter alia, for each IP address 1) the number of concurrent connections (Conn); 2) the current data flow rate (Curr rate); and 3) the average bits per second (bps) over a one minute interval (1 Min avg). In addition, in one implementation, host database 134 maintains for each host address the following fields: 4) the number of new flows or connections for which the host is a client over the last minute; 5) the number of new flows or connections for which the host is a server over the last minute; and 6) the number of failed flows corresponding to a given host. In some implementations, host database 134 may also be configured to maintain: 7) the number of current or existing TCP (or other handshake-oriented protocol) connections for which the host is a client; 8) the number of current UDP (or other similar protocol) connections for which the host is a client; 9) the number of current or existing TCP (or other handshake-oriented protocol) connections for which the host is a server; and 10) the number of current UDP (or other similar protocol) connections for which the host is a server. As discussed above, packet processor 92 is operative to identify new data flows, as well as the termination of existing data flows, and updates the statistics identified above as data flows traverse network device. As discussed below, traffic classification engine 96, in one implementation, is operative to access these values, as well as other data structures (e.g., flow database 135) to classify a data flow. In one embodiment, a process executing in the packet processing path, for example, can collect the raw data at periodic intervals for subsequent evaluation by other processes or modules, such as traffic classification engine 96.

In addition, administrator interface 150 may also access the host database and display its current state to a network administrator. In one implementation, administrator interface 150 allows various views of the information in host database 134 sorted (in ascending or descending order) based on one of the selected data fields of the database. Administrator interface 150, in one implementation, is also operative to facilitate configuration of a traffic class based on one or more attributes maintained by the host database 134. For example, administrator interface 150 may allow a user to select one or more entries (as well as one or more data fields) in host database 134 and use the values corresponding to the selected entries and data fields to configure a traffic class. For example, administrator interface 150 can compute the minimum values for each data field across the selected entries and use them as the basis for matching attributes in a traffic class.

A.2. Traffic Classification

A traffic class comprises a set of matching rules or attributes allowing for logical grouping of data flows that share the same characteristic or set of characteristics—e.g., a service ID or type (see Section A.1., above), a specific application, protocol, IP address, MAC address, port, subnet, a behavior pattern or profile, etc. In one embodiment, each traffic class has at least one attribute defining the criterion(ia) used for identifying a specific traffic class. In one implementation, the attributes defining a given traffic class can be based on explicitly presented attributes of one or more packets corresponding to a data flow, or be based on behavioral attributes of the end systems associated with the flow. The U.S. patent applications identified above disclose various network traffic classification mechanisms that can be incorporated into embodiments of the present invention. For example, a traffic class can be defined by configuring an attribute defining a particular IP address or subnet. Of course, a particular traffic class can be defined in relation to a plurality of related and/or orthogonal data flow attributes. U.S. Pat. Nos. 6,412,000 and 6,591,299, and U.S. patent application Ser. No. 10/039,992 describe some of the data flow attributes that may be used to define a traffic class, as well as the use of hierarchical classification structures to associate traffic classes to data flows. In one embodiment, application traffic management device 130 includes functionality allowing for classification of network traffic based on information from layers 2 to 7 of the OSI reference model. Application traffic management device 130 can be configured to include matching rules that define a plurality of network applications commonly found in enterprise networks, such as database applications, Citrix® flows, ERP applications, and the like. As discussed below, the matching rules or attributes for a traffic class may be based on various types of node behavior, such as the number of concurrent connections of the inside or outside host.

In one embodiment, application traffic management device 130 is configured to include a predefined set of traffic classes based upon a knowledge base gleaned from observation of common or known traffic types on current networks. Application traffic management device 130, in one embodiment, also allows an administrator to manually create a traffic class by specifying a set of matching attributes. As discussed above, administrator interface 150, in one embodiment, allows for selection of a traffic class and the configuration of traffic management policies for the selected traffic class. Administrator interface 150, in one embodiment, also allows for the selection and arrangement of traffic classes into hierarchical reference trees. In one embodiment, traffic classification engine 96 also stores traffic classes added by the traffic discovery module. Furthermore, as discussed below, application traffic management device 130 may also include traffic class discovery functionality that automatically adds traffic classes to traffic classification engine 96 in response to data flows traversing the device. Automatic network traffic discovery and classification (see below) is disclosed in U.S. Pat. Nos. 6,412,000, 6,457,051, and 6,591,299, which are incorporated herein by reference.

Traffic classification engine 96, in one implementation, stores traffic classes associated with data flows that traverse access link 21. Traffic classification engine 96, in one embodiment, stores the traffic classes and corresponding data (e.g., matching rules, policies, partition pointers, etc.) related to each traffic class in a hierarchical tree. This tree is organized to show parent-child relationships—that is, a particular traffic class may have one or more subordinate child traffic classes with more specific characteristics (matching rules) than the parent class. For example, at one level a traffic class may be configured to define a particular user group or subnet, while additional child traffic classes can be configured to identify specific application traffic associated with the user group or subnet.

In one embodiment, the root traffic classifications are "/Inbound" and "/Outbound" data flows. Any data flow not explicitly classified is classified as "/Inbound/Default" or "/Outbound/Default". The "LocalHost" traffic class corresponds to packets and data flows destined for application traffic management device 130, such as requests for stored measurement data, traffic class mapping packets, or device configuration changes. In one embodiment, traffic classification engine 96 attempts to match to a leaf traffic class node before proceeding to remaining traffic class nodes in the hierarchical configuration. If a traffic class is found, the traffic classification engine 96 stops the instant search process and returns the identified traffic classification. Of course, one skilled in the art will recognize that alternative ways for traversing the hierarchical traffic class configuration can be implemented. For example, traffic classification engine 96 may be configured to traverse all traffic class nodes at a given level before proceeding to lower levels of the traffic classification tree.

In one embodiment, administrator interface 150 displays the traffic class tree and allows for selection of a traffic class and the configuration of bandwidth utilization controls for that traffic class, such as a partition, a policy, or a combination thereof. Administrator interface 150 also allows for the arrangement of traffic classes into a hierarchical classification tree. Application traffic management device 130 further allows an administrator to manually create a traffic class by specifying a set of matching rules and, as discussed below, also automatically creates traffic classes by monitoring network traffic across access link 21 and classifying data flows according to a set of criteria to create matching rules for each traffic type. In one embodiment, each traffic class node includes a traffic class identifier; at least one traffic class (matching) attribute; at least one policy parameter (e.g., a bandwidth utilization control parameter, a security policy parameter, etc.), a pointer field reserved for pointers to one to a plurality of child traffic classes. In one embodiment, traffic classification engine 96 implements a reference tree classification model wherein separate traffic classification trees can be embedded in traffic class nodes of a given traffic classification tree. U.S. application Ser. No. 10/236,149, incorporated by reference herein, discloses the use and implementation of embeddable reference trees.

A.2.a. Automatic Traffic Classification

In one implementation, network device application processor 75 further includes a traffic discovery module (not shown) that analyzes data flows for which no matching traffic class was found in traffic classification engine 96. The traffic discovery module, in one embodiment, is operative to apply predefined sets of matching rules to identify a traffic class corresponding to non-matching data flows. In one implementation, the traffic discovery module operates on data flows classified as either/Inbound/Default or Outbound/Default. In one embodiment, the traffic discovery module is configured to include a predefined set of traffic classes based upon a knowledge base gleaned from observation of common or known traffic types on current networks. In one embodiment, the traffic discovery module creates traffic classes automatically in response to data flows traversing bandwidth management device 130 and stores such traffic classes in traffic classification engine 96. Automatic traffic classification is disclosed in U.S. Pat. Nos. 6,412,000, 6,457,051, and 6,591,299, which are incorporated herein by reference.

As discussed above, the traffic discovery module applies one or more traffic discovery thresholds when deciding whether to present or add newly discovered traffic classes. In one embodiment, the traffic discovery module must detect a minimum number of data flows within a predefined period for a given traffic type before it creates a traffic class in traffic classification engine 96. In one embodiment, such discovered traffic classes are, by default, attached to or associated with either the "/Inbound/Autodiscovered/" or "/Outbound/Auto-discovered/" bandwidth control category, as appropriate. As discussed below, administrator interface 150 allows for configuration of bandwidth controls for auto-discovered traffic classes. In one embodiment, auto-discovered traffic classes are automatically assigned predefined bandwidth utilization controls. U.S. patent application Ser. No. 09/198,051, incorporated by reference herein, discloses automatic assignment of bandwidth utilization controls for discovered traffic classes. Furthermore, as discussed above, the traffic discovery module is operative to dynamically adjust one or more traffic discovery thresholds depending on at least one observed parameter or attribute, such as the rate of discovering new traffic classes relative to the number of data flows.

In one implementation, the traffic discovery module automatically adds newly discovered traffic classes to traffic classification engine 96, which are presented to the network administrator with manually configured and/or previously discovered traffic classes. In an alternative embodiment, the traffic discovery module may save the newly discovered traffic classes in a separate data structure and display them separately to a network administrator. The list may be sorted by any well-known criteria such as: 1) most "hits" during a recent interval, 2) most recently-seen (most recent time first), 3) most data transferred (bytes/second) during some interval, or a moving average. The user may choose an interval length or display cutoff point (how many items, how recent, at least B bytes per second, or other thresholds). The network manager may then take some action (e.g. pushing a button) to select the traffic types she wishes to add to the classification tree.

A.2.b. Orthogonal Attribute Classification

As discussed in U.S. application Ser. No. 10/938,435, traffic classification engine 96, in one implementation, supports matching rule predicates that correspond to various conditions, such as node behavior and path metrics, which are orthogonal to explicit packet attributes. In some implementations, this allows for a bandwidth management scheme that can classify data flows relative to the observed behavior of either one of, or both, the end systems or nodes associated with a data flow and can apply appropriate policies to the flows. In one implementation, the matching rule predicates for node behavior are based on statistics maintained by host database 134 (see above), such as the numbers of currently active flows (in the aggregate or with respect to a certain protocol, such as TCP or UDP) and rate of new flows. In other implementations, additional or alternative matching rule predicates can be created based on network path metrics, such as observed round-trip time, packet exchange time, normalized network delay, server delay, total delay, and/or current transmission rate (bps). U.S. application Ser. No. 10/812,198 discloses the computation of how these metrics can be computed. Computation of packet exchange time is disclosed in U.S. application Ser. No. 09/710,442. Other characteristics orthogonal to packet attributes that one could use to classify traffic are current CPU utilization or the inbound or outbound link utilizations. For example, data flows can be classified based on the CPU utilization or load placed on application traffic management device 130, access link 21 and/or even router 22 (by polling its interface via SNMP, for example), as opposed to the behavior of the corresponding end systems or explicit packet attributes of a given flow. In one implementation, the matching rules, traffic classes, and policies can be created once and continue to carry out their objectives without any reconfiguration of traffic classification engine 96. Still further, these orthogonally-based predicates may be combined with matching rules that operate on attributes of the packets themselves (see above) to achieve a variety of objectives.

The following provides matching rule predicates, according to one implementation of the invention, that can be used in connection with configuration commands entered in a command line interface:

1) client-flow-rate:<low>-<high>: This command specifies a range for the number of new flows or connections for which the host is a client over the last minute. This predicate can be applied to inside and/or outside hosts relative to application traffic management device 130 (see Section A.1., above). The rates are specified in flows-per-minute (FPM) or you may use "unlimited" for the <high> value.
2) server-flow-rate:<low>-<high>: This command specifies a range for the number of new flows or connections for which the host is a server over the last minute. This predicate can be applied to inside and/or outside hosts
3) failed-flow-rate:<low>-<high>: This command specifies a range for the number of failed flows or connections for which a host is a client. For TCP flows, a failed flow can be detected when a RST packet is transmitted in response to a SYN packet, or when no response to a SYN packet is received after a threshold period of time.
4) tcp-flows:<low>-<high>: This command specifies a range of the number of current TCP flows for a host.
5) udp-flows:<low>-<high>: This command specifies a range of the number of current UDP flows for a host.

A.3. Flow Control Module

As discussed above, flow control module 94 applies bandwidth utilization controls (and, in some embodiments, other policies) to data flows traversing access link 21. The above-identified patents and patent applications describe the operation of, and bandwidth utilization controls, implemented or supported by flow control module 94. Application traffic management device 130, however, can also be configured to implement a variety of different policy types, such as security policies, admission control policies, marking (diffserv, VLAN, etc.) policies, redirection policies, caching policies, transcoding policies, and network address translation (NAT) policies. Of course, one of ordinary skill in the art will recognize that other policy types can be incorporated into embodiments of the present invention. The functionality of flow control module 94, in one implementation, can be conceptually segregated into three main tasks: 1) allocation of bandwidth to individual flows, 2) enforcement of bandwidth allocations, and 3) monitoring of actual bandwidth utilization to provide feedback to subsequent bandwidth allocations.

Allocation of bandwidth is primarily influenced by three main factors: 1) the number of concurrent flows and their respective traffic classifications; 2) the overall or aggregate bandwidth utilization control scheme configured by the network administrator (such as the capacity of the access link, the partitions that have been configured, configured rate policies, and the like), and 3) the respective target rates corresponding to the individual flows. U.S. application Ser. No. 10/810,785 and U.S. Pat. Nos. 5,802,106 and 6,205,120, incorporated by reference above, disclose methods for determining target rates for data flows for use in bandwidth allocation decisions. As discussed above, a user can select a given traffic class and specify one or more bandwidth utilization controls for the traffic class. A bandwidth utilization control for a particular traffic class can comprise an aggregate bandwidth utilization control, a per-flow bandwidth utilization control, or a combination of the two (see Sections A.3.a. & A.3.b.). The combination of bandwidth utilization controls across the traffic classes defines an aggregate bandwidth utilization control scheme.

Flow control module 132 can use any suitable functionality to enforce bandwidth allocations known in the art, including, but not limited to class-based queuing, weighted fair queuing, class-based weighted fair queuing, Committed Access Rate (CAR) and "leaky bucket" techniques. Flow control module 132, in one implementation, may incorporate any or a subset of the TCP rate control functionality described in the cross-referenced U.S. patents and/or patent applications set forth above for controlling the rate of data flows.

A.3.a. Aggregate Bandwidth Utilization Control

An aggregate bandwidth utilization control operates to manage bandwidth for aggregate data flows associated with a traffic class. An aggregate bandwidth utilization control can be configured to essentially partition the available bandwidth corresponding to a given access link. For example, a partition can be configured to protect a network traffic class by guaranteeing a defined amount of bandwidth and/or limit a network traffic class by placing a cap on the amount of bandwidth a traffic class can consume. Such partitions can be fixed or "burstable." A fixed partition allows a traffic class to use in the aggregate a defined amount of bandwidth. A fixed partition not only ensures that a specific amount of bandwidth will be available, but it also limits data flows associated with that traffic class to that same level. A burstable partition allows an aggregate traffic class to use a defined amount of bandwidth, and also allows that traffic class to access additional unused bandwidth, if needed. A cap may be placed on a burstable partition, allowing the traffic class to access up to a maximum amount of bandwidth, or the burstable partition may be allowed to potentially consume all available bandwidth across the access link. Partitions can be arranged in a hierarchy—that is, partitions can contain partitions. For example, the bandwidth, or a portion of the bandwidth, available under a parent partition can be allocated among multiple child partitions. In one embodiment, at the highest level, a partition exists for all available outbound bandwidth, while another partition exists for all available inbound bandwidth across the particular access link. These partitions are then sub-dividable to form a hierarchical tree. For example, an enterprise employing static partitions may define a static partition for a PeopleSoft software application traffic class, and sub-divide this parent partition into a large burstable child partition for its human resources department and a smaller burstable child partition for the accounting department. U.S. patent application Ser. No. 10/108,085 includes a discussion of methods for implementing partitions, as well as novel solutions for implementing partitions arranged in a hierarchical allocation scheme.

In one embodiment, a partition is created by selecting a traffic class and configuring a partition for it. As discussed above, configurable partition parameters include 1) minimum partition size (in bits per second); 2) whether it is burstable (that is, when this option is selected, it allows the partition to use available excess bandwidth; when the option is not selected the partition has a fixed size); and 3) maximum bandwidth to be used when the partition bursts. For example, a network administrator may configure a partition for data flows associated with suspicious users to limit the effect of the network traffic associated with them on utilization of access link 21.

A.3.b. Per-Flow Bandwidth Utilization Controls

Flow control module 132 is also operative to enforce per-flow bandwidth utilization controls on traffic across access link 21. Whereas aggregate bandwidth utilization controls (e.g., partitions, above) allow for control of aggregate data flows associated with a traffic class, per-flow bandwidth utilization controls allow for control of individual data flows. In one embodiment, flow control module 132 supports different bandwidth utilization control types, including, but not limited to, priority policies, rate policies, and discard policies. A priority policy determines how individual data flows associated with a traffic class are treated relative to data flows associated with other traffic classes. A rate policy controls the rate of data flows, for example, to smooth bursty traffic, such as HTTP traffic, in order to prevent a TCP end system from sending data packets at rates higher than access link 21 allows, thereby reducing queuing in router buffers and improving overall efficiency. U.S. patent application Ser. No. 08/742,994, now U.S. Pat. No. 6,038,216, incorporated by reference above, discloses methods and systems allowing for explicit data rate control in a packet-based network environment to improve the efficiency of data transfers. Similarly, U.S. Pat. No. 6,018,516, incorporated by reference above, methods and systems directed to minimizing unneeded retransmission of packets in a packet-based network environment. A rate policy can be configured to establish a minimum rate for each flow, allow for prioritized access to excess available bandwidth, and/or set limits on total bandwidth that the flow can consume. A discard policy causes flow control module 132 to discard or drop data packets or flows associated with a particular traffic class. Other policy types include redirection policies where an inbound request designating a particular resource, for example, is redirected to another server.

A.4. Traffic Class Tagging and Coordinated Traffic Classification

Figure 4:
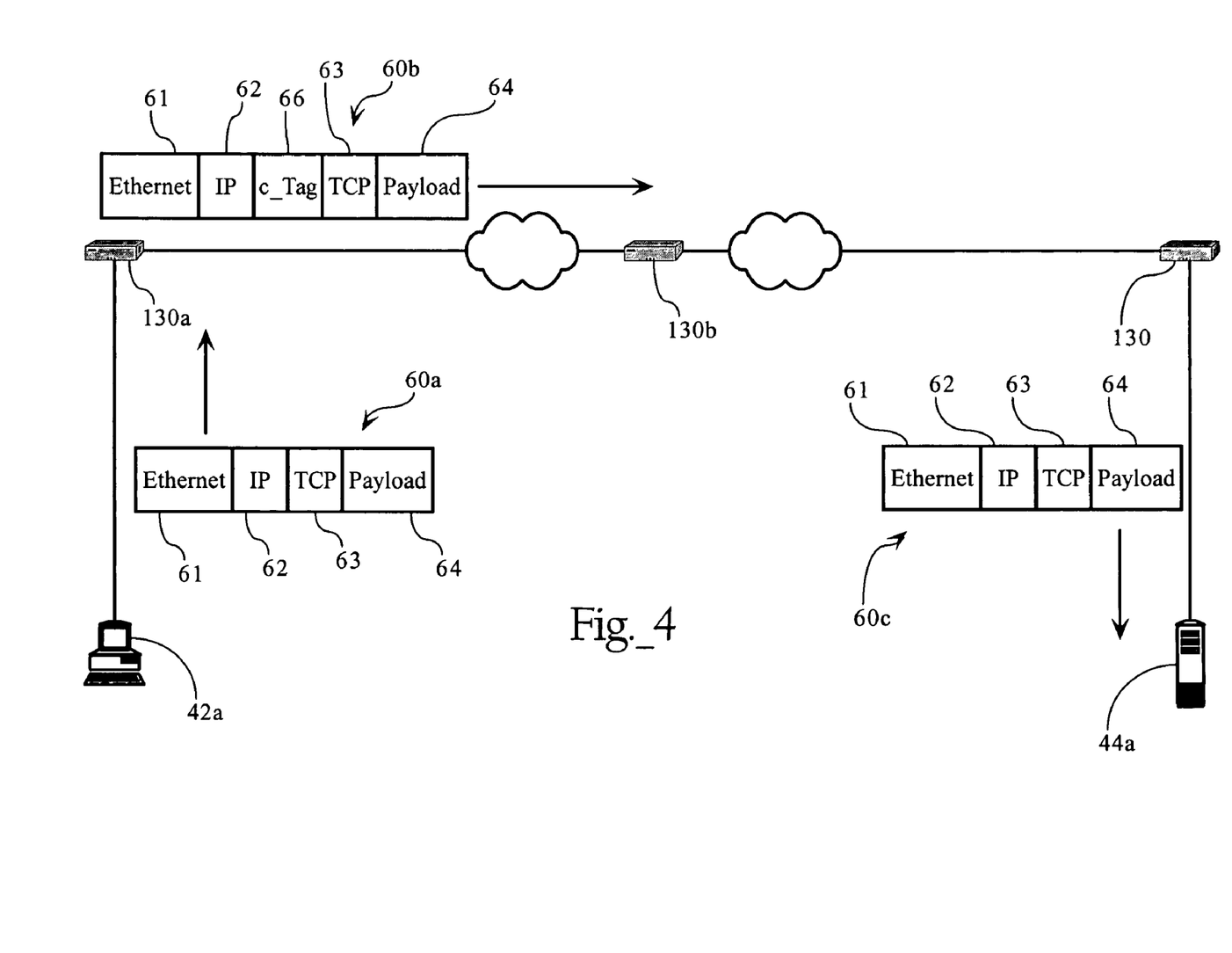
FIG. 4 is a functional block diagram illustrating an operation of a coordinated network traffic classification environment, according to one implementation of the present invention.

As discussed more fully below, embodiments of the present invention reduce redundant traffic classification operations by exchanging traffic classification information with peered network devices. As discussed above, according to the methodology of the prior art, application traffic management devices 130, 130a, & 130b would classify flows along the path from source to destination individually and independently. This configuration results in the performance of one or more redundant network traffic classification operations, such as operations associated with inspecting packets, determining service identifiers, matching to behavior patterns or attributes, and the like. In addition, if the traffic classification configurations are substantially identical, the resulting classification of a given data flow at each device may be identical or substantially similar. To reduce the redundant processing associated with classifying the same data flow at two or more network devices, a small tag or header, which conveys traffic class or service type information, is added to one or more packets in a given flow. Network devices that are downstream of the first network device that added the tag or header can use this information, instead of independently classifying the data flow. This eliminates processing overhead on the packets that would otherwise consume CPU resources at the downstream network devices. As FIG. 4 illustrates, the coordinated traffic classification mechanism can operate between application traffic management devices 130 and 130a. In other embodiments, the coordinated traffic classification functionality described herein can also be implemented on intermediate network devices, such as application traffic management device 130b, disposed in the communications path between application traffic management devices 130 and 130a.

A.4.a. Traffic Class Tagging

Figure 3:
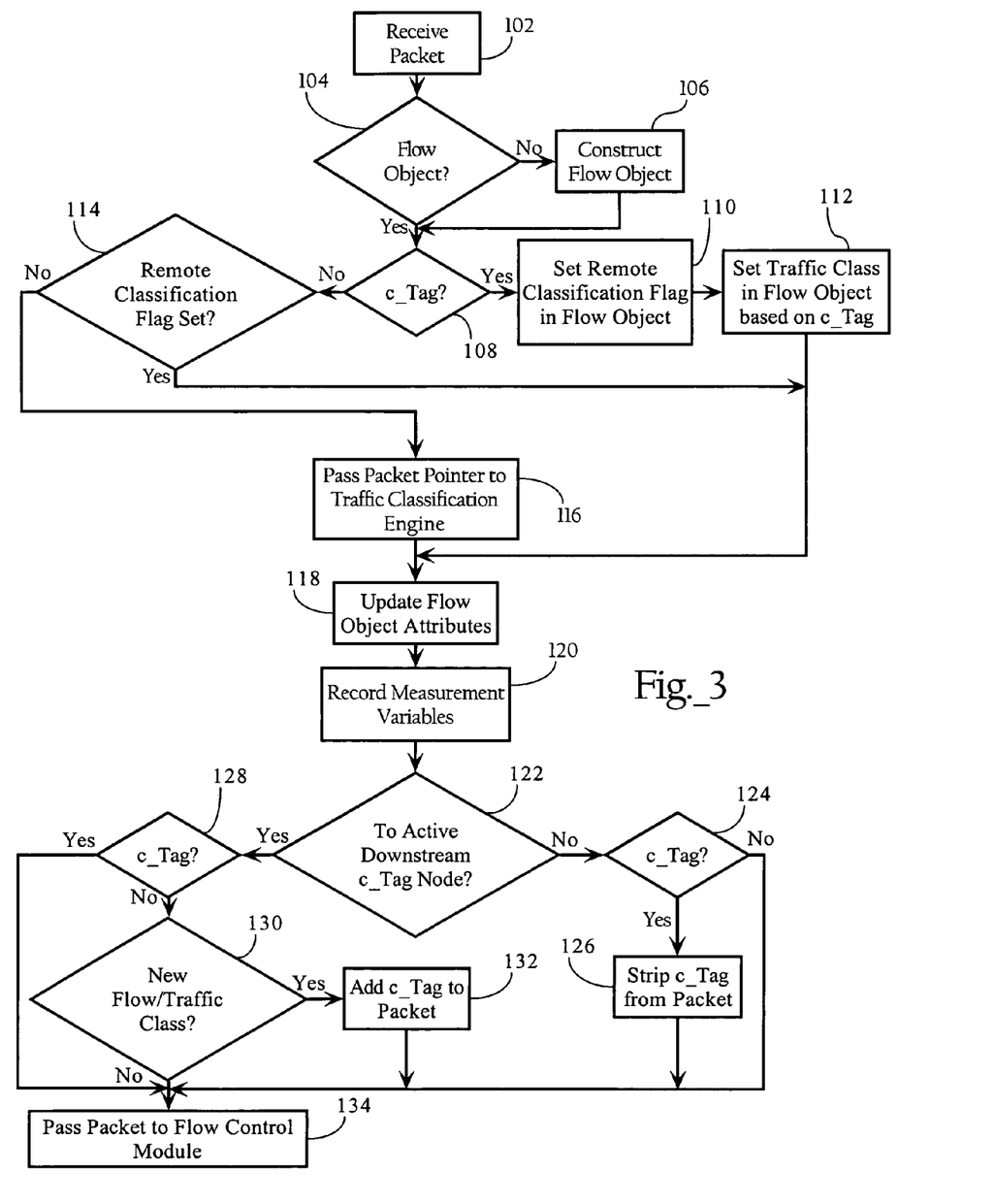
FIG. 3 is a flow chart diagram showing a method, according to one implementation of the present invention, directed to coordinating network traffic classification among peer network devices.

FIGS. 3 and 4 illustrate the process and information flow, according to one implementation of the present invention, directed to tagging data flows with traffic class information for use by down stream network devices. As FIG. 4 illustrates, host 42a transmits a packet 60a destined for host 44a. As FIG. 4 shows, packet 60a comprises an Ethernet (or other link layer) header 61, an Internet Protocol (IP) header 62, a Transmission Control Protocol (TCP) header 63, and payload 64. Application traffic management device 130a classifies the packet as discussed above and, in one implementation, adds a traffic class tag (c_Tag) 66 as a header between the IP header 62 and the TCP header 63. Of course, one skilled in the art will recognize that the Ethernet header will also change as the packet traverses the communications path between host 42a and host 44a. Application traffic management device 130a then forwards the modified packet 60b along the communications path to host 44a. In the implementation shown, intermediate application traffic management device 130b receives the modified packet 60b, identified the c_Tag 66, and uses the traffic class information in the c_Tag to classify the data flow (as opposed to independently operating on the packet or a collection of packets in the data flow to classify the data flow). Since the intermediate application traffic management device 130b is configured with knowledge of a downstream application traffic management device 130, which is capable of recognizing and processing c_Tags, intermediate application traffic management device 130b forwards the packet 60b along the communications path. Application traffic management device 130 receives packet 60b, uses the traffic class information in the c_Tag to classify the data flow, modifies packet 60b by stripping the c_Tag 66, and forwards the modified packet 60c to host 44a. As one skilled in the art will recognize, the inclusion of traffic classification information in one or more packets of a given data flow allows the downstream application traffic management devices 130 and 130b to bypass independent classification (thereby saving CPU resources), while otherwise performing other network functions, such as traffic monitoring and/or flow control tasks. In addition, it is to be understood, that the information flow can proceed in the opposite direction from application traffic management device 130 to application traffic management device 130a.

FIG. 3 illustrates the overall process flow, according to one implementation of the present invention, directed to the operation of application traffic management devices 130, 130a, 130b. In one embodiment, packet processor 92 receives a data packet (FIG. 3, 102) and determines whether flow database 135 contains an existing control block object corresponding to the data flow (104) (see Section A.1., supra). If no control block object corresponds to the data packet, packet processor 92 constructs a control block object including attributes characterizing the data flow, such as source address, destination address, service type, etc. (106) (see above). In one embodiment, packet processor 92 analyzes the source and destination IP addresses in the packet header and scans host database 134 for matching entries. If no matching entries exist, packet processor 92 creates new entries for the source and destination IP addresses. As discussed above, in one embodiment, a control block object contains a flow specification object including such attributes as pointers to the "inside" and "outside" IP addresses in host database 134, as well as other flow specification parameters, such as inside and outside port numbers, service type, protocol type, pointers to variable-length information in a dynamic memory pool, and other parameters characterizing the data flow.

Packet processor 92 can also perform other operations, such as analyzing the packets for connection state information. For example, packet processor 92 can inspect various TCP flags to determine whether the received packet is part of a new data flow or represents a change to an existing data flow (such as the first data packet after the TCP handshake). Methods for determining new data flows and assigning packets to existing data flows are well known in the art and also depend on the particular transport layer protocol employed. For a TCP packet, packet processor 92 can determine a new data flow by detecting SYN and/or SYN/ACK packets. However, a new data flow can simply be a data flow for which there is no corresponding control block object in flow database 135. In addition, with UDP and GRE flows (where there is no explicit connection mechanism, such as SYN packets), a new flow is recognized by associating the source and destination addresses and port numbers to the flow and the flow type (e.g., UDP, GRE, etc.). Accordingly, when a UDP packet identifies a new address/port pair, the attributes discussed above are stored in a data structure along with the time of last packet. A new UDP flow between the same address/port pairs can be determined by comparing the last packet time to a threshold value (e.g., 2 minutes). If the difference between the time of the latest packet and the time of the last packet is greater than the threshold, the new packet is deemed part of a new flow. In another embodiment, a separate process monitors the last packet times associated with UDP, GRE and similar flow types to detect termination of a given flow.

Figure 3A:
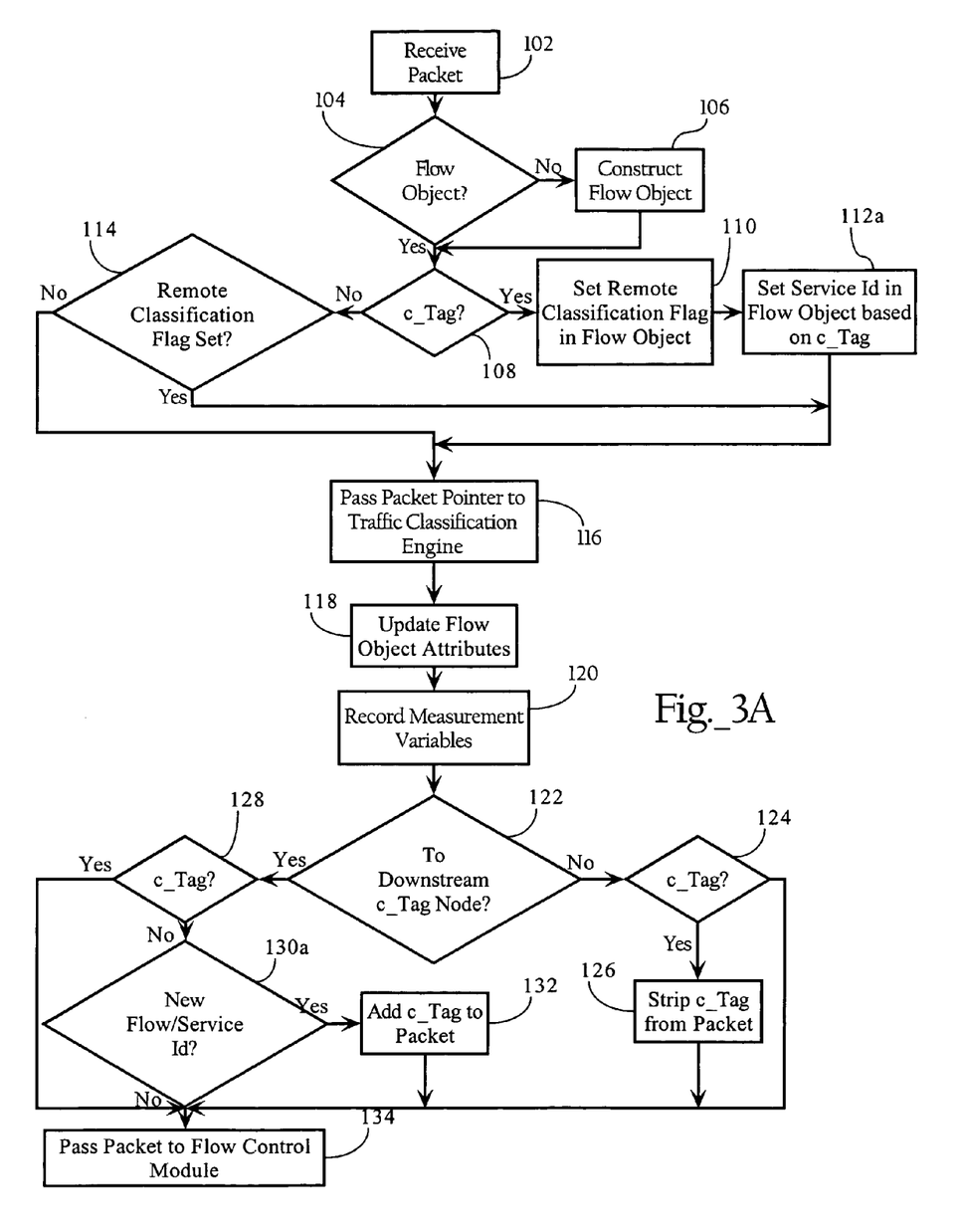
FIG. 3A is a flow chart diagram showing a method, according to another implementation of the present invention, directed to coordinating network traffic classification among peer network devices.

As FIG. 3 illustrates, packet processor 92 also inspects the received packet for the presence of traffic classification information (c_Tag 66) (108). If the packet contains a c_Tag, packet processor 92, in one implementation, sets the remote classification flag in the corresponding control block object in order to bypass local classification of the data flow. Packet processor 92 also writes traffic class information in the control block object based on the traffic class information in the c_Tag (112). For example and in one implementation, if the c_Tag is present (or the remote classification flag is set), packet processor 92 bypasses the identification of one or more service identifiers (see Section A.1.). In addition, depending on the information carried in the c_Tag, the packets in the data flow can also bypass the traffic classification engine 96. For example (as FIG. 3A illustrates), if the traffic class information in the c_Tag identifies or maps to service identifiers, then packet processor 92 sets the service identifiers in the flow object based on the information in the c_Tag (112a). However, the packet is passed to traffic classification engine 96 for classification. As shown in FIG. 3, if the traffic class information in the c_Tag identifies or maps directly to a traffic class, then the packet may also bypass traffic classification engine 96 (as shown in FIG. 3).

In one implementation, not every packet in a given flow includes a c_Tag. For example, in many implementations, application traffic management device 130 may have to encounter several packets corresponding to a data flow in order to finally classify the data flow. For example, the initial TCP handshake packets may only reveal IP address, port numbers and protocol identifiers. While this information may be sufficient to identify HTTP traffic, for example, additional packets (such as data packets) may reveal a more specific network application, such as an accounting application, that utilizes HTTP. As discussed more fully below, a peer application traffic management device 130, in one implementation, is configured to add a c_Tag to the first packet in the flow, and to selected subsequent packets, when additional traffic classification (such as a new traffic class, or a more specific service identifier) is obtained. For example, an email (where the TCP handshake packets initially identify an SMTP port) may include an attached digital image file. Accordingly, while the initial data packets in the flow may include simple text data, subsequent packets may contain image data. Packet processor 92, in one embodiment, is operative to detect such changes in the characteristics of the data flow by examining data encapsulated in the headers of each packet, such as the detection of MIME types, etc. U.S. Pat. No. 6,046,980 and U.S. Pat. No. 6,591,299, as well as other patents and patent applications identified above, disclose methods for classifying packet network flows. As a further example, an RTSP application data flow can be further classified to RTSP-Broadcast or RTSP-REALNET-TCP in the middle of the flow after a particular signature in the packets is encountered. According to such an implementation, even if the packet does not include a c_Tag, packet processor 92 checks the state of the remote traffic classification flag in the flow object (114) to bypass some or all of the local traffic classification operations discussed herein. Furthermore, if a subsequent packet does include a c_Tag, packet processor updates the traffic class information accordingly.

As FIG. 3 illustrates, if the remote classification flag is set (114), local traffic classification by traffic classification engine 96 is bypassed. Otherwise, a pointer to the packet, in one implementation, is passed to traffic classification engine 96, which operates as discussed above to classify the data flow. As FIG. 3 illustrates, application traffic management device 130 may also perform other operations in response to arrival of the packet. For example, packet processor 92 may update other flow object attributes (118), such as the packet count, last packet time, and the like. In addition, measurement engine 140 may record certain measurement variables on an aggregate or per-traffic class basis (120).

As FIG. 3 further illustrates, application traffic management device 130 is also configured to conditionally add c_Tags to outgoing packets, or conditionally strip existing c_Tags from outgoing packets. In one implementation, prior to egress from application traffic management device 130, packet processor 92 determines whether an active c_Tag enabled node is deployed in the communications path to the destination host identified in the packet (122). If so and the packet includes an existing c_Tag (128), the packet is passed unmodified to flow control module 94 (134). If the packet does not include an existing c_Tag and if the packet is the first packet in a new flow, or the traffic classification information for an existing flow has changed (130), packet processor adds a c_Tag to the packet (132). Lastly, if no active c_Tag enabled node is in the path to the destination host, packet processor strips any existing c_Tags from the packets (124, 126). Still further, the embodiment shown in FIG. 3A operates in a substantially similar manner, whereby a c_Tag is added to subsequent packets in a data flow when new service identifier information is obtained (130a).

As one skilled in the art will appreciate, the present invention creates certain efficiencies by reducing the CPU and other resources required to classify the data flow independently at each application traffic management device. Beyond the efficiencies realized by implementations of the present invention, other advantages or features can be realized. For example, the present invention allows a data flow to be classified by a first application traffic management device 130 based on one or more behavioral attributes of an end system corresponding to the data flow. The c_Tag allows this classification information to propagate to peer network devices even though the peers may not be in a position to observe the same behavioral attributes of the end system.

A.4.b. Configuration of Peer Network Devices

To operate effectively, application traffic management devices 130, 130a & 130b must be configured with network information that allows each device to determine whether a c_Tag-enabled device is deployed in the communications path to the destination hosts identified in the packets traversing the network. In one implementation, application traffic management devices 130 and 130*a*, and optionally application traffic management device 130*b*, can be configured with network address information, such as specific IP addresses or subnet ranges, for each network interface 71, 72 for which the coordinated classification functionality is to be applied. In such an implementation, packet processor 92 adds c_Tags to packets whose destination network addresses fall within a specified IP address or subnet range, assuming the downstream peer network device is active. In addition, in one implementation, application traffic management device 130 may also support an exception list that excludes specified IP addresses from a previously configured subnet range. In one implementation, a network administrator can configure each application traffic management device by accessing administrator interface 150 on the desired device(s). In another implementation, a network administrator can access a network management system that is operative to configure the desired application traffic management device(s) selected by the network administrator.

In another implementation, each application traffic management device can be dynamically configured. For example, each application traffic management device 130 can be configured with the subnets or IP addresses that may be accessed through it by remote systems. In addition, each application traffic management device may be operative to dynamically probe the communications path to various destination hosts, as disclosed in U.S. application Ser. No. 10/015,826, to discover one or more c_Tag-enabled network devices in the communications path. The probes can be transmitted from both interfaces 71 and 72 to discover c_Tag-enabled network devices. The probed devices can respond to the probes with an identification of the subnet(s) and/or IP addresses for which it has network reachability. Through this probing process each c_Tag enabled device in the communications path can be configured with the requisite information.

As discussed above, application traffic management device 130 adds c_Tags only when a peer network device is active. In other words, if a peer network device goes down, such that no remaining c_Tag enabled peers remain in the communications path to a given destination host, then application traffic management device 130 stops adding c_Tags until the at least one peer becomes active. Monitoring the state of peer network devices can be accomplished in a variety of ways. For example, each peer can be configured to periodically transmit "keep alive" messages to all other peers. If a keep alive message is not received from a given peer during a given interval, the other peers assume that the peer is down or inactive. In other implementations involving the tunneling of flows between peers (see below), the tunnel status information can be used to determine whether a peer is active. Still further, the state of a peer network device can also be determined by receiving packets including c_Tags from that device. The peer device can be identified by comparing the source address of the tagged packet with the network reachability information discussed above.

A.4.c. c_Tag Content

As FIG. 4 illustrates, in one embodiment, traffic class information can be included in a c_Tag header 66 disposed between IP header 62 and TCP header 63. The classification information in the c_Tag header 66 can include, or map to, one or more service identifiers discussed above in Section A.1. This configuration allows traffic classification information to be exchanged, while also allowing for different traffic classification configurations, which use the service identifiers as matching attributes to classify traffic, on each peer network device. In other implementations, the traffic classification information can include, or directly map to, traffic class identifiers, such as application names. In one implementation, the traffic class information in each c_Tag comprises an arbitrary string of alphanumeric characters that map to different service or traffic class identifiers. In some implementations that use mapping, application traffic management devices 130 periodically transmit mapping messages to all peer devices. The mapping messages specify the mapping between an arbitrary string and a corresponding service or traffic class identifier. U.S. application Ser. No. 10/676,383 discloses the use of mapping messages that specify the mapping of an arbitrary string to a corresponding traffic class. The number of bits required for the traffic class information will depend on configuration details, such as the number of desired traffic class or service identifiers, and/or the desired length of application names. In one implementation, however, a 16-bit identifier is used.

The c_Tag may also include a hash of the traffic classification information to allow downstream peer network devices to validate that the c_Tag data has not been corrupted or modified. Furthermore, the c_Tag may be encrypted using either private key or public key encryption algorithms. For example, in one implementation, the c_Tag information may include the traffic classification information, a hash of the traffic classification concatenated with the packet itself. This information can then be encrypted using a public key or a secret key. Downstream peer devices with knowledge of the private or secret key can decrypt the contents of the c_Tag and verify the hash. In one implementation, if the c_Tag can not be validated, application traffic management device 130 can classify the data flow locally.

Other implementations are possible. For example, as discussed above, the c_Tag may be a separate header. In such an embodiment, the use of a custom or proprietary IP protocol number may be required. The downstream network device that removes the c_Tag, in such an implementation, also replaces the proprietary IP protocol number with a standard protocol identifier. In another implementation, the c_Tag information can be included in a proprietary TLV-Format header as an IP option appended to the IP header 62. In addition, the c_Tag data can be included in a tunnel header that encapsulates the packet transmitted between peer network devices.

A.4.d. Alternative Implementation—Tunneling

As mentioned above, application traffic management devices 130 and 130*a* can operate to tunnel network traffic between the end systems connected to networks 40, 40*a*. In such an implementation, the c_Tag data discussed above can be included in the encapsulating tunnel headers. In another implementation, however, separate c_Tag headers can be used that are encrypted with the rest of the native packet, assuming encryption or compression is used between the peer network devices.

Lastly, although the present invention has been described as operating in connection with end systems and networks employing the TCP, IP and Ethernet protocols, the present invention has application in computer network environments employing any suitable transport layer, network layer and link layer protocols. Moreover, other system architectures are possible. For example, the protocol stack of one or more end systems can be modified to include an agent program to include c_Tag information on outgoing packets and strip c_Tag information from incoming packets. Still further, the coordinated traffic classification functionality described herein can be used between network devices deployed in redundant network topologies. U.S. application Ser. Nos.

10/611,573 and 10/858,340 disclose the use of synchronization packets transmitted between redundant network devices. In these systems, the synchronization packets can include c_Tags to reduce CPU utilization at the partner network device required by traffic classification. Accordingly, the present invention has been described with reference to specific embodiments. Other embodiments of the present invention will be apparent to one of ordinary skill in the art. It is, therefore, intended that the claims set forth below not be limited to the embodiments described above.

What is claimed is:

1. An apparatus for use in a coordinated network traffic classification system, comprising
 a memory for buffering received first packets traversing in a first direction and second packets traversing in a second direction corresponding to data flows traversing a network path;
 a traffic classification engine operative to classify the data flows in a traffic class from a plurality of traffic classes;
 a packet processor operative to
  associate the received first packets and second packets buffered in the memory with corresponding data flows;
  conditionally add traffic classification information generated by the traffic classification engine to at least one of the first packets in a first data flow;
  cause a second data flow, for which at least one of the second packets includes traffic classification information, to bypass operation of one or more matching rules implemented by the traffic classification engine, wherein each of the one or more matching rules corresponds to a traffic class and comprises one or more matching attributes against which corresponding attributes of the data flows are compared; and
  conditionally strip traffic classification information added to the second packets by remote second network devices; and
 a flow control module operative to
  forward the first packets including the conditionally added traffic classification information to remote first network devices; and
  forward the second packets to destination hosts.

2. A coordinated network traffic classification system, comprising
 a first network device operably connected to a first network, wherein the first network comprises at least one host;
 a second network device operably connected to a second network, wherein the second network comprises at least one host;
 a communication path between the first and second network devices;
 wherein the first network device is operative to:
  classify a data flow between a host on the first network and a host on the second network, wherein the data flow comprises at least one packet;
  modify a packet in the data flow by adding traffic class information to the packet in the data flow; and
  forward the modified packet including the traffic class information along the communications path to the host on the second network;
 wherein the second network device, comprises a network traffic classification engine operative to classify, independently from the first network device, data flows between the first and second networks, and wherein the second network device, is operative to:
  receive the modified packet including the traffic class information from the first network device;
  use the traffic class information in the modified packet to classify the data flow corresponding to the packet, to bypass operation of one or more matching rules implemented by the network traffic classification engine, wherein each of the one or more matching rules corresponds to a traffic class and comprises one or more matching attributes against which corresponding attributes of the data flows are compared; and
  strip the traffic class information from the modified packet.

3. The system of claim 2 wherein the second network device is further operative to forward the packet, stripped of the traffic class information, to the host on the second network.

4. The system of claim 2 wherein the traffic class information added to the modified packet by the first network device is contained in a separate traffic class header.

5. The system of claim 4 wherein the packet modified by the first network device comprises a network layer header and a transport layer header; and wherein the traffic class header is inserted between the network layer and transport layer headers.

6. The system of claim 2 wherein the traffic class information comprises a service identifier; and wherein the network traffic classification engine uses service identifiers as matching attributes to classify data flows.

7. The system of claim 2 wherein the traffic class information comprises a traffic class identifier.

8. The system of claim 2 wherein the traffic class information comprises a value string that maps to a traffic class identifier.

9. The system of claim 8 wherein the first network device is further operative to transmit a mapping message to the second network device, wherein the mapping message specifies the mapping between the value string and the corresponding traffic class identifier.

10. The system of claim 2 wherein the network traffic classification engine uses service identifiers as matching attributes to classify data flows; and wherein the traffic class information comprises a value string that maps to a service identifier.

11. The system of claim 10 wherein the first network device is further operative to transmit a mapping message to the second network device, wherein the mapping message specifies the mapping between the value string and the corresponding service identifier.

12. The system of claim 2 wherein the traffic class information added to the modified packet is encrypted.

13. The system of claim 2 wherein the communication path comprises a packet-switched network.

14. The system of claim 13 wherein the packet-switched network is a wide area network.

15. The system of claim 2 wherein the communication path comprises an access link.

16. The system of claim 2 further comprising a third network device disposed on the communications path between the first and second network device; wherein the third network device, comprises a network traffic classification engine operative to classify, independently from the first and second network device, data flows between the first and second networks, and wherein the third network device, is operative to:
 receive the modified packet from the first network device;
 use the traffic class information in the modified packet to classify the data flow corresponding to the packet, to bypass operation of one or more matching rules implemented by the network traffic classification engine, wherein each of the one or more matching rules corresponds to a traffic class and comprises one or more matching attributes against which corresponding attributes of the data flows are compared; and forward the modified packet to the host on the second network.

17. The system of claim 2 wherein the first network device is operative to add traffic class information to a first-encountered packet in the data flow.

18. The system of claim 17 wherein the second network device, after detection of the traffic class information in the modified packet, bypasses operation of one or more matching rules implemented by the network traffic classification engine for all packets in the data flow subsequent to the modified packet.

19. The system of claim 17 wherein the first network device is operative to add traffic class information to at least one packet in the data flow subsequent to the first-encountered packet, when traffic class information additional to the traffic class information added to the first-encountered packet is obtained.

20. A method for use in a coordinated network traffic classification system, comprising buffering in a memory received first packets traversing in a first direction and second packets traversing in a second direction corresponding to data flows traversing a network path;

invoking a traffic classification engine operative to classify the data flows in a traffic class from a plurality of traffic classes;

associating the received first packets and second packets buffered in the memory with corresponding data flows;

conditionally adding traffic classification information generated by the traffic classification engine to at least one of the first packets in a first data flow;

causing a second data flow, for which at least one of the second packets includes traffic classification information, to bypass operation of one or more matching rules implemented by the traffic classification engine, wherein each of the one or more matching rules corresponds to a traffic class and comprises one or more matching attributes against which corresponding attributes of the data flows are compared; and conditionally stripping traffic classification information added to the second packets by remote second network devices;

forward the first packets including the conditionally added traffic classification information to remote first network devices; and forwarding the second packets to destination hosts.

21. A network device, comprising:
one or more network interfaces;
a memory;
a processor; and
computer-executable program code stored in the memory and executable by the processor, the computer-executable program code comprising:

a packet processor module comprising computer-executable instructions configured, when executed, to cause the processor to process a packet received at the network device, the packet being sent from a source network device to a destination network device along a communication path on which the network device is disposed, comprising:

determine whether traffic classification information is contained in the packet;

if the traffic classification information is not contained in the packet, then:

cause a traffic classification engine module to generate the traffic classification information for the packet;

add the traffic classification information to the packet; and cause a flow controller module to forward the packet together with the traffic classification information to a next network device along the communication path; and if the traffic classification information is contained in the packet, then determine whether the next network device along the communication path is the destination network device; and if the next network device is not the destination network device, then:

provide the traffic classification information to the traffic classification engine module;

cause the traffic classification engine module to bypass operation of one or more matching rules corresponding to a traffic class specified in the traffic classification information; and cause the flow controller module to forward the packet together with the traffic classification information to the next network device along the communication path; and if the next network device is the destination network device, then:

remove the traffic classification information from the packet; and cause the flow controller module to forward the packet without the traffic classification information to the destination network device;

the traffic classification engine module comprising computer-executable instructions configured, when executed, to cause the processor to:

determine the traffic class and generate the traffic classification information for the packet based on a data flow to which the packet belongs; and operate the one or more matching rules corresponding to the traffic class of the packet; and the flow controller module comprising computer-executable instructions configured, when executed, to cause the processor to forward the packet along the communication path.

\* \* \* \* \*